(12) United States Patent
Watanabe et al.

(10) Patent No.: US 8,405,804 B2
(45) Date of Patent: Mar. 26, 2013

(54) LIQUID CRYSTAL DISPLAY UNIT

(75) Inventors: Hisashi Watanabe, Osaka (JP); Tokio Taguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 12/733,055

(22) PCT Filed: Aug. 1, 2008

(86) PCT No.: PCT/JP2008/002078
§ 371 (c)(1),
(2), (4) Date: Feb. 4, 2010

(87) PCT Pub. No.: WO2009/019839
PCT Pub. Date: Feb. 12, 2009

(65) Prior Publication Data
US 2010/0134733 A1    Jun. 3, 2010

(30) Foreign Application Priority Data
Aug. 9, 2007   (JP) ................................ 2007-208017

(51) Int. Cl.
*G02F 1/1335*    (2006.01)
(52) U.S. Cl. .......................................... 349/112; 349/95
(58) Field of Classification Search .................. 349/112
See application file for complete search history.

(56) References Cited

U.S. PATENT DOCUMENTS

| | | | |
|---|---|---|---|
| 6,111,699 A | 8/2000 | Iwata et al. | |
| 6,266,112 B1 | 7/2001 | Mizobata et al. | |
| 6,348,960 B1 | 2/2002 | Etori et al. | |
| 6,359,735 B1 | 3/2002 | Gombert et al. | |
| 7,088,409 B2 | 8/2006 | Itou et al. | |
| 7,425,395 B2 | 9/2008 | Tanno et al. | |
| 2001/0035929 A1 | 11/2001 | Nakamura et al. | |
| 2002/0089620 A1 | 7/2002 | Yamamoto et al. | |
| 2003/0067574 A1 | 4/2003 | Sasaki et al. | |
| 2005/0074579 A1 | 4/2005 | Suzuki et al. | |
| 2005/0093210 A1 | 5/2005 | Umetani et al. | |
| 2006/0256263 A1* | 11/2006 | Shimizu et al. ............... 349/113 |
| 2007/0159698 A1 | 7/2007 | Taguchi et al. | |

FOREIGN PATENT DOCUMENTS

| | | |
|---|---|---|
| EP | 1 089 114 | 4/2001 |
| JP | 05-323371 | 12/1993 |
| JP | 07-104272 | 4/1995 |

(Continued)

OTHER PUBLICATIONS

International Preliminary Report on Patentability dated Feb. 24, 2010.

(Continued)

*Primary Examiner* — Richard Kim
(74) *Attorney, Agent, or Firm* — Harness, Dickey & Pierce, P.L.C.

(57) ABSTRACT

A liquid crystal display device of an embodiment of the present invention includes a liquid crystal layer, a specular reflection layer, the polarization layer disposed on the viewer's side, a retardation layer interposed between the liquid crystal layer and the polarization layer, and a light scattering layer disposed on the viewer's side of the polarization layer. The light scattering layer has a scattering surface. The scattering surface includes a macro uneven structure which has light scatterability and a micro uneven structure which is superimposedly formed over the macro uneven structure and which is smaller than visible light wavelengths.

11 Claims, 11 Drawing Sheets

FOREIGN PATENT DOCUMENTS

| | | |
|---|---|---|
| JP | 07-306408 | 11/1995 |
| JP | 2000-199809 | 7/2000 |
| JP | 2001-074919 | 3/2001 |
| JP | 2002-107714 | 4/2002 |
| JP | 2002-169025 | 6/2002 |
| JP | 2002-318383 | 10/2002 |
| JP | 2003-004904 | 1/2003 |
| JP | 2005-132660 | 5/2005 |
| JP | 2005-234554 | 9/2005 |
| JP | 2005-338256 | 12/2005 |
| JP | 2006-098623 | 4/2006 |
| JP | 2006-208726 | 8/2006 |
| WO | WO 03/073410 | 9/2003 |
| WO | WO 2005/050627 | 6/2005 |
| WO | WO 2006/059686 | 6/2006 |

OTHER PUBLICATIONS

Armin Plichta et al. "Flexible Glass Substrates," Flexible Flat Panel Displays, Edited by G.P. Crawford, John Wiley & Sons, Ltd., XP002631694, 2005, pp. v-xvii, 35-45, and 48-55.

Tatsuo Uchida et al. "Reflective Liquid-Crystal Displays," MRS Bulletin, vol. 27, No. 11, Nov. 1, 2002, pp. 876-879, XP55017950.

\* cited by examiner

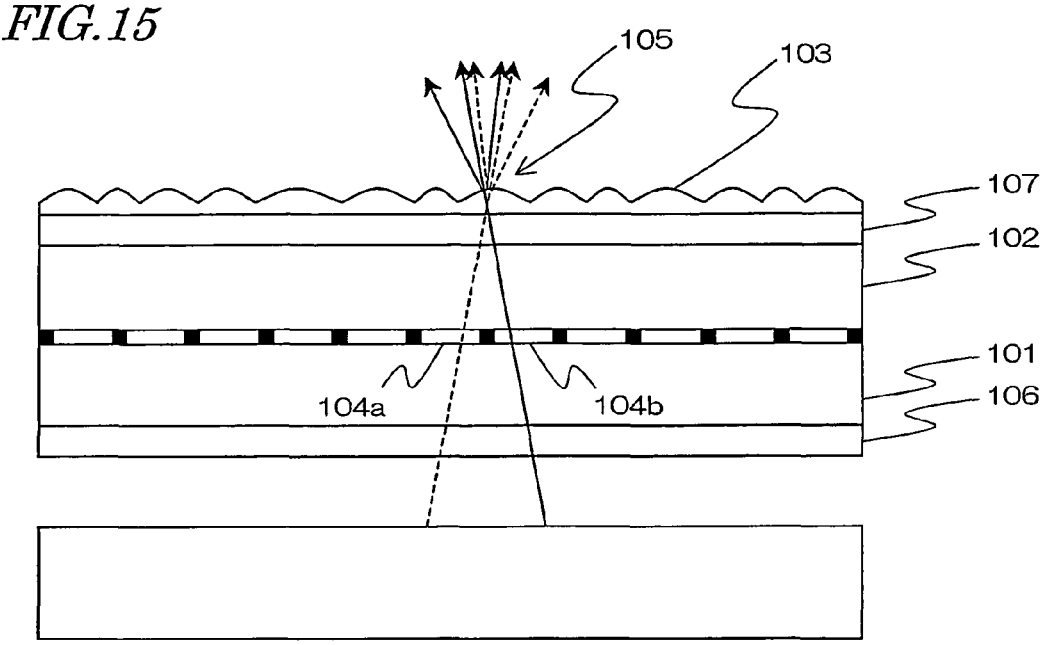

LIQUID CRYSTAL DISPLAY UNIT

TECHNICAL FIELD

The present invention relates to a liquid crystal display device capable of display in reflection mode.

BACKGROUND ART

In recent years, applications of liquid crystal display devices to mobile devices, typically to mobile phones and notebook computers, are rapidly advancing. Among the liquid crystal display devices, reflective-type liquid crystal display devices configured to reflect light incoming from the outside, such as ambient light, for display are capable of low power consumption and thin light-weight body because of no need for a backlight as a light source and are therefore especially suitable to mobile applications. However, on the other hand, the reflection-type liquid crystal display devices disadvantageously provide darker display because of the absence of a backlight.

To increase the display brightness of the reflection-type liquid crystal display devices, it is necessary to increase the reflection intensity in a direction perpendicular to a display screen which is a major viewing direction while making the reflection intensity have an appropriate angle distribution. For example, use of a specular reflection layer increases the regular reflection intensity but results in a problem of glare such that a background, such as a face of a viewer, is reflected in the display. That is, the problem is that the background is seen to be superimposed on the displayed images. Therefore, the reflection characteristics required for the reflection-type liquid crystal display devices do not include specular reflection but appropriate diffuse reflection. Appropriately-diffused light enables paper white display.

In view of such circumstances, attempts have been made up to now to improve the reflection characteristics of the reflection-type liquid crystal display devices. The reflection-type liquid crystal display devices widely used as of now is of such a type which includes a single polarizing plate on the viewer's side and which uses light reflected by a reflection layer provided on the rear face side of the liquid crystal layer (opposite to the viewer's side) for display. The reflection-type liquid crystal display devices referred to in this specification are also of this type unless stated otherwise.

For example, Patent Document 1 discloses a reflection-type liquid crystal display device in which the surface of pixel electrodes formed of a high-reflectance metal, such as aluminum, has an uneven shape such that the pixel electrodes have diffuse reflection characteristics. The reflection-type liquid crystal display devices of this type have a disadvantage of cost increase due to additional steps for the formation of appropriate unevenness in the surface of the pixel electrodes. They have other disadvantages, such as nonuniform orientation of liquid crystal molecules, varying retardation, etc., because the surface which is in contact with the liquid crystal layer has an unevenness.

Meanwhile, a reflection-type liquid crystal display device is under development in which a specular reflection layer formed of a high-reflectance metal such as aluminum (e.g., specular reflection pixel electrode) is used, and an extra element is added for providing diffuse reflection characteristics.

For example, Patent Document 2 discloses a reflection-type liquid crystal display device in which a forward scattering film is disposed on the outer side (viewer's side) of a viewer-side polarizing plate. The forward scattering film includes a light scattering layer made of a polymer binder containing spherical particles dispersed therein, the spherical particles having the average particle diameter of 1 µm to 10 µm. The relative refractive index of the spherical particles to the binder, n, is set to a value exceeding 0.91 and smaller than 1.09. Such a scattering layer which utilizes the difference in refractive index is sometimes referred to as "internal scattering layer". Patent Document 2 says that, with the view of achieving excellent paper whiteness, the haze ratio of the forward scattering film is preferably 30% or higher and that, with the view of displaying images without obscuration, the image clarity measured by a transmission method is preferably 60% or higher (paragraphs [0037] to [0039]).

Patent Document 3 discloses a reflection-type liquid crystal display device in which a surface of the viewer-side polarizing plate on the outer side is used as a light scattering surface. The light scattering surface is formed by making a light transmitting resin surface uneven. The average height of the unevenness is 1 to 5 µm, the average pitch is 5 to 40 µm, and the haze ratio is 9 to 14% (FIG. 2, paragraph [0045]). When the haze ratio of the light scattering surface is 25% or higher, the problem of unclear displayed images cannot be prevented. When the haze ratio is 6% or lower, the problem of reflection of external images (background) in displayed images cannot be prevented (paragraph [0074]). Herein, a surface having an unevenness which exhibits light scatterability as the light scattering surface described in Patent Document 3 does is sometimes referred tows "scattering surface".

Patent Document 4 discloses a reflection-type liquid crystal display device which includes a light scattering layer on the outer side of the viewer-side polarizing plate, the light scattering layer including an internal scattering layer and a scattering surface. Patent Document 4 says that the depth of unevenness of the light scattering layer is preferably 0.05 µm to 10 µm. Patent Document 4 describes, as an example, a light scattering layer which is formed of an acrylic resin (refractive index: 1.5) containing granular $MgF_2$ of 0.2 µm (refractive index: 1.38) dispersed therein and which has an unevenness with the depth of 0.1 µm to 0.5 µm (paragraph [0035]). Patent Document 4 says that use of such a light scattering layer prevents reflection of background in display (phenomenon where a virtual image of the light source is observed) and specular reflection (regular reflection) at the outermost surface (paragraphs [0009] to [0010], [0013] to [0015], and [0022]).

[Patent Document 1] Japanese Laid-Open Patent Publication No. H5-323371
[Patent Document 2] Japanese Laid-Open Patent Publication No. 2000-199809
[Patent Document 3] Japanese Laid-Open Patent Publication No. H7-306408
[Patent Document 4] Japanese Laid-Open Patent Publication No. H7-104272 (Japanese Patent No. 2898860)
[Patent Document 5] Japanese National Phase PCT Laid-Open Publication No. 2001-517319
[Patent Document 6] WO2006/059686A1

DISCLOSURE OF INVENTION

Problems to be Solved by the Invention

In the reflection-type liquid crystal display device described in Patent Document 2, the surface (outermost surface) on the viewer's side is flat. Therefore, even if it is a surface of the internal scattering layer, the display quality deteriorates due to specular reflection by the surface.

When the outermost surface has an uneven shape as in the reflection-type liquid crystal display devices described in Patent Document 3 or 4, the specular reflection is prevented, but the contrast ratio deteriorates. This problem is caused because large part of the light incident in directions near to the direction normal to the display surface is reflected (rearwardly scattered) by the slopes of the unevenness. The light reflected (rearwardly scattered) by the scattering surface advances toward the viewer's side without reaching the liquid crystal layer and therefore constitutes noise in the light for display of images, deteriorating the contrast ratio in display.

Note that the above-described conventional problems which would occur in the reflection-type liquid crystal display devices are also valid for reflective-type liquid crystal display devices in which each pixel includes a region where display is carried out in the reflection mode (referred to as "reflection region") and a region where display is carried out in the transmission mode (referred to as "transmission region").

One of the major objects of the present invention is to improve the display quality of a liquid crystal display device which has a specular reflection layer capable of low cost production.

Means for Solving the Problems

A liquid crystal display device of the present invention includes: a liquid crystal layer; a first substrate disposed on a viewer's side of the liquid crystal layer; a second substrate disposed so as to oppose the first substrate via the liquid crystal layer; a specular reflection layer interposed between the liquid crystal layer and the second substrate; a pair of electrodes for applying a voltage to the liquid crystal layer; a polarization layer disposed on a viewer's side of the first substrate; and a light scattering layer disposed on a viewer's side of the polarization layer, the light scattering layer having a scattering surface, the scattering surface including a macro uneven structure which has a light scatterability and a micro uneven structure which is superimposedly formed over the macro uneven structure and which is smaller than visible light wavelengths.

In one embodiment, a distance between adjacent raised portions or recessed portions of the micro uneven structure is preferably in a range equal to or greater than 100 nm and smaller than 200 nm.

In one embodiment, a distance between raised portions or recessed portions of the macro uneven structure is preferably from 5 μm to 50 μm.

In one embodiment, the macro uneven structure preferably has a periodic structure which has a pitch of 20 μm or less.

In one embodiment, a haze ratio of the light scattering layer is preferably 50% or higher.

In one embodiment, a distance between the light scattering layer and the liquid crystal layer is preferably equal to or less than three times a pixel pitch.

In one embodiment, the raised portions or recessed portions of the macro uneven structure have an asymmetric shape which has a long axis and a short axis, and the long axis being oriented in a predetermined direction relative to a transmission axis of the polarization layer when the light scattering layer is seen in a direction normal to the first substrate.

In one embodiment, the scattering surface of the light scattering layer is in contact with air.

In one embodiment, the device further includes a protection layer disposed on a viewer's side of the scattering surface of the light scattering layer, wherein a refractive index of the protection layer is smaller than a refractive index of the light scattering layer.

Effects of the Invention

According to the present invention, the display quality of a reflection-type liquid crystal display device which has a specular reflection layer can be improved. Since the specular reflection layer (typically, specular reflection pixel electrode) is used, increase in production cost which would occur in Patent Document 1 would not occur. Since the light scattering layer includes a macro uneven structure which has light scatterability and a micro uneven structure which is superimposedly formed over the macro uneven structure and which is smaller than visible light wavelengths, the rearward scattering is suppressed, and as a result, the contrast ratio improves. The viewing angle characteristics can be adjusted by controlling the structure of the light scattering layer. Since it is only required to attach the light scattering layer to the outer surface of the polarization layer, a reflection-type liquid crystal display device which has various viewing angle characteristics can be provided by a convenient process.

BRIEF DESCRIPTION OF DRAWINGS

[FIG. 15] Schematic view for illustration of a phenomenon where images become obscure in the case where the light scattering layer has a large haze ratio.

Figure 1:
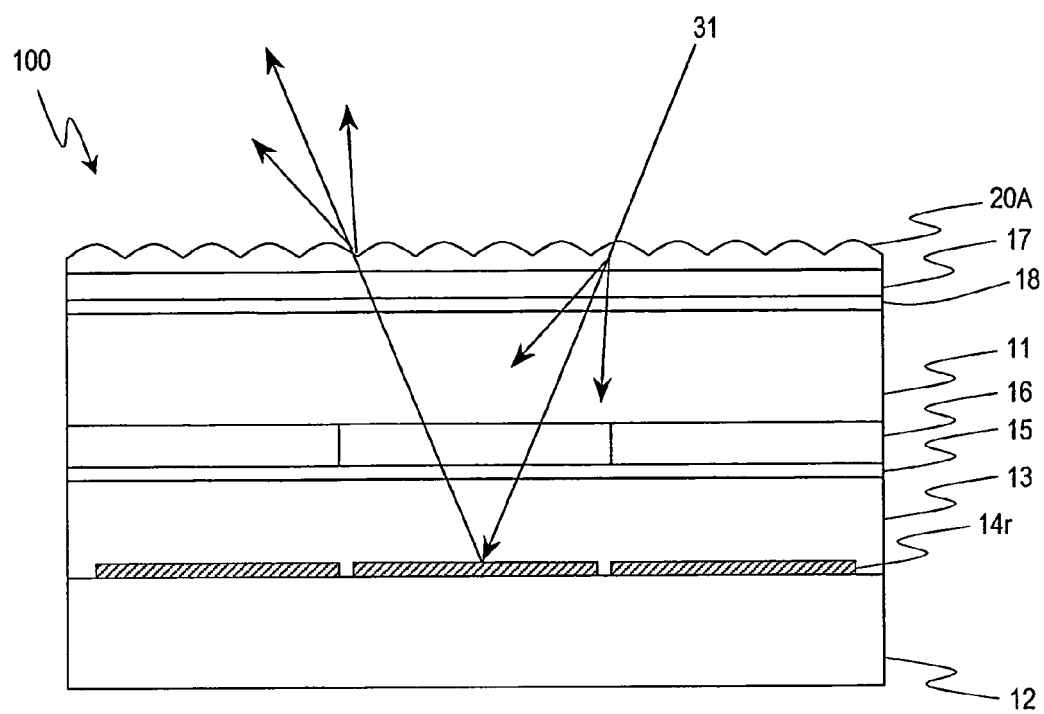
[FIG. 1] Schematic cross-sectional view of a reflection-type liquid crystal display device 100 of an embodiment of the present invention.

DESCRIPTION OF THE REFERENCE NUMERALS 11 first substrate
12 second substrate
13 liquid crystal layer
14r specular reflection layer (specular reflection pixel electrode)
14t transparent electrode
15 transparent electrode (counter electrode)

16 color filter layer
17 polarization layer
18 retardation layer
20A light scattering layer
22a macro uneven structure
22b micro uneven structure

BEST MODE FOR CARRYING OUT THE INVENTION

Hereinafter, the structure of a liquid crystal display device of an embodiment of the present invention and a method for driving the liquid crystal display device are described with reference to the drawings. Note that the present invention is not limited to the embodiment described below.

FIG. 1 is a schematic cross-sectional view of a reflection-type liquid crystal display device 100 of an embodiment of the present invention.

The liquid crystal display device 100 includes a liquid crystal layer 13, a first substrate 11 disposed on the viewer's side of the liquid crystal layer 13, and a second substrate 12 disposed so as to oppose the first substrate 11 via the liquid crystal layer 13. Provided between the first substrate 11 and the liquid crystal layer 13 is a color filter layer 16 for performing display in colors. The liquid crystal display device 100 further includes a specular reflection layer 14r interposed between the liquid crystal layer 13 and the second substrate 12, and a pair of electrodes 14r and 15 for applying a voltage to the liquid crystal layer 13. For example, the electrode 15 is a common electrode formed by a transparent conductive layer (e.g., ITO). The electrodes 14r are pixel electrodes. Here, the specular reflection layer 14r also serves as the pixel electrodes. Provided on the second substrate 12 are TFTs (thin film transistors) coupled to the pixel electrodes 14r and various wires (gate bus lines, source bus lines, etc.), although none of these are shown. The specular reflection layer 14r is preferably formed of a material which has high light reflectance, and is commonly formed by a thin film of aluminum, silver, or the like. The specular reflection layer 14r has a flat surface. Even when the specular reflection layer 14r is formed over the TFTs and wires, the haze ratio would not exceed 1%, so that it functions as a specular reflection layer.

The liquid crystal display device 100 further includes the color filter layer 16 between the first substrate 11 and the liquid crystal layer 13 for performing display in colors, although the color filter layer 16 may be omitted. The liquid crystal display device 100 is configured such that the specular reflection layer 14r functions as the pixel electrodes 14r although, as a matter of course, the pixel electrodes may be transparent electrodes under which another specular reflection layer is provided (on the side opposite to the liquid crystal layer). The first substrate and the second substrate 12 are typically transparent substrates, such as glass substrates. The second substrate 12 disposed on the rear face side of the liquid crystal layer 13 does not need to transmit visible light and therefore may be formed using a semiconductor substrate.

The liquid crystal display device 100 includes a polarization layer 17 disposed on the viewer's side of the first substrate 11, a retardation layer 18 interposed between the polarization layer 17 and the liquid crystal layer 13, and a light scattering layer 20A disposed on the viewer's side of the polarization layer 17. Here, the retardation layer 18 is a quarter-wave plate which is disposed to have a slow axis of 45° relative to the transmission axis (polarization axis) of the polarization layer 17. The retardation layer 18 converts linearly-polarized light transmitted through the polarization layer 17 to circularly-polarized light. The liquid crystal display device 100 is a reflection-type liquid crystal display device of a so-called single polarizing plate type. An adhesive layer used for bonding the light scattering layer 20A and the polarization layer 17 is preferably made of a material which has a refractive index near to those of the light scattering layer 20A and the polarization layer 17 with the view of reducing reflection at the interfaces of the adhesive layer. Note that a protection layer may be provided between the polarization layer 17 and the light scattering layer 20A. In this specification, the polarization layer refers to a layer which is typically formed by stretching PVA containing iodine and which does not contain a protection layer of triacetyl cellulose (TAC) or the like.

Here, as will be described later with reference to FIGS. 3 and 4, the light scattering layer 20A has a scattering surface. The scattering surface includes a macro uneven structure 22a which has light scatterability and a micro uneven structure 22b which is superimposedly formed over the macro uneven structure 22a and which is smaller than the visible light wavelengths. In the macro uneven structure 22a, with the view of scattering light, the distance between the raised portions or recessed portions of the unevenness (S: the length in the plane of the light scattering layer) is at least on the order of visible light wavelengths or longer, and is preferably from 5 μm to 50 μm. The depth of the macro uneven structure 22a (D: the length from the apex of a raised portion to the bottom of a recessed portion in the normal direction of the light scattering layer) is preferably determined such that the ratio of the depth to the distance between the raised portions or recessed portions (S), RA=D/S, is from 0.1 to 0.4. When RA is smaller than 0.1, there is a probability that sufficient light scatterability cannot be obtained. When RA is greater than 0.4, reflection at the surface of the macro uneven structure 22a increases so that the contrast ratio can decrease. Alternatively, the macro uneven structure 22a may have a periodic structure with the pitch of 10 μm or smaller as described herein as an example. The macro uneven structure 22a has an appropriate level of light scatterability, achieving the haze ratio of 50% or higher. On the other hand, in the micro uneven structure 22b, the distance between adjacent raised portions or recessed portions is preferably in the range equal to or greater than 100 nm and smaller than 200 nm. The micro uneven structure 22b is a so-called motheye structure, in which the refractive index for incident light continuously changes, along the depth direction of the uneven structure 22b, from the refractive index of the incident medium (herein, air) to the refractive index of the substrate (herein, the polarization layer 17), whereby an antireflection effect is achieved. Specifically, the micro uneven structure 22b serves an excellent antireflection function (reflectance of 0.5% or lower). The micro uneven structure 22b superimposedly formed over the macro uneven structure 22a serves to prevent rearward scattering and, as a result, the light scattering layer 20A functions as a near-ideal forward scattering layer.

Figure 2:
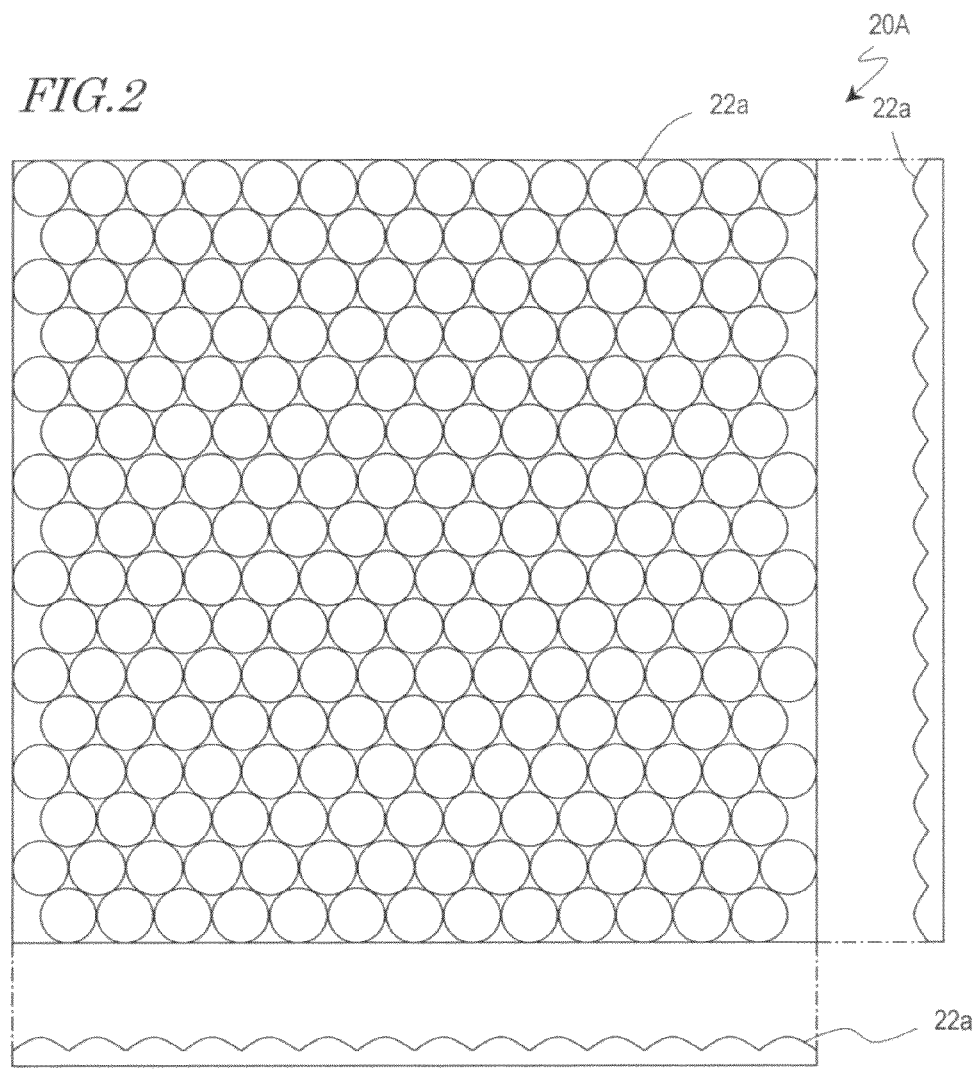
[FIG. 2] Schematic plan view and cross-sectional views for illustration of a macro uneven structure 22a of a light scattering layer 20A of the reflection-type liquid crystal display device 100.

The macro uneven structure 22a of the light scattering layer 20A is, for example, in a regular arrangement as shown in FIG. 2. FIG. 2 presents a plan view of the light scattering layer 20A which is seen in a direction normal to the substrate 11, i.e., in a direction perpendicular to the display surface of the liquid crystal display device 100, showing the trough lines of the macro uneven structure 22a, and vertical and horizontal cross-sectional views thereof. The micro uneven structure 22b is herein omitted from the drawing. A configuration of the macro uneven structure 22a which includes a continuously-formed unevenness with small flat areas is preferable in terms of light scatterability. The presence of the flat part can cause generation of interference colors. The interference colors are likely to occur especially in the case where the uneven structure is in a regular arrangement. In the macro uneven structure 22a shown in FIG. 2, the outline of a raised portion which is seen in a direction normal to the display surface is a circle with the diameter of 20 µm, the horizontal pitch is 20 µm, and the vertical pitch is 18 µm.

Next, the structure and functions of the light scattering layer 20A including the micro uneven structure 22b are described with reference to FIG. 3 to FIG. 5.

The average size of the macro uneven structure 22a is preferably, as described above, at least on the order of visible light wavelengths or longer with the view of scattering light, and is at least smaller than the pixel size with the view of preventing nonuniform diffusion in each pixel. Specifically, the average size is preferably in the range from 780 nm to 50 µm. The distance between the raised portions or recessed portions is preferably from 5 µm to 50 µm.

The average size of the micro uneven structure 22b is on the order of visible light wavelengths or smaller. To prevent reflection and diffraction over the entire visible light wavelength range (from 380 nm to 780 nm), the period of adjacent raised portions or recessed portions is preferably in the range equal to or greater than 100 nm and smaller than 200 nm.

First, the effects on ambient light incident on the light scattering layer 20A are described with reference to FIG. 3 Specifically, the effects of the light scattering layer 20A on ambient light incident on the liquid crystal display device 100 shown in FIG. 1 from the viewer's side are described.

Figure 3:
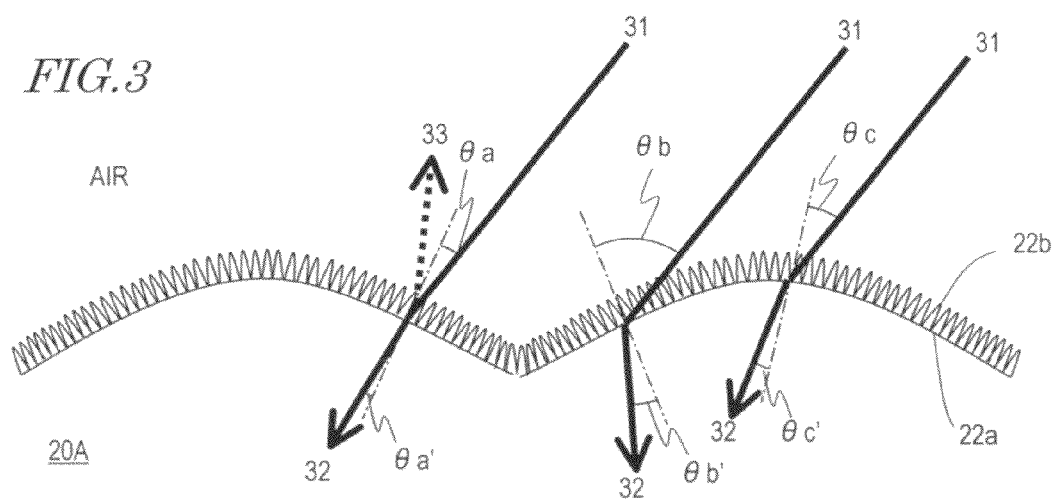
[FIG. 3] Schematic view for illustration of the function on ambient light incident on the light scattering layer 20A.

In an example explained herein, as shown in FIG. 3, light 31 incident on the light scattering layer 20A is collimated light which propagates in the same direction.

Since the surface of the light scattering layer 20A has the macro uneven structure 22a, the incident light is refracted in different directions according to the Snell's Law, depending on the position of incidence of light, as shown in FIG. 3. Thus, the following formulae (1) to (3) hold:

$$\sin \theta a = n \sin \theta a' \quad (1)$$

$$\sin \theta b = n \sin \theta b' \quad (2)$$

$$\sin \theta c = n \sin \theta c' \quad (3)$$

where n is the refractive index of the light scattering layer 20A, θa, θb, and θc are the angles of incidence, and θa', θb', and θc' are the angles of emission.

Therefore, the light transmitted through the light scattering layer 20A is diffused in various directions. The behavior of light can be qualitatively expressed as shown above, although actual light is diffused in various directions due to a scattering phenomenon which cannot be simply represented only by refraction. The degree of diffusion (scattering angle) depends on the slope angle of the macro uneven structure 22a. In the case of an uneven structure approximately defined by, for example, part of the surface of a sphere, the diffusion becomes more intense (the scattering angle increases) as the radius of the sphere decreases.

Since the surface of the light scattering layer 20A has the micro uneven structure 22b which is a motheye structure, the regular reflectance is 0.5% or lower. Therefore, the light quantity of reflected light (rearwardly-scattered light) 33 is very small, and 99.5% or more of the incident light 31 passes through the light scattering layer 20A to become scattered light 32. Specifically, 99.5% or more of the light incident on the light scattering layer 20A from the viewer's side is converted to forwardly-scattered light 32 with scarce rearward scattering. In this way, the light scattering layer 20A functions as a substantially-ideal forward scattering layer for the light incident from the viewer's side.

Next, the function on display light incident from the rear face side of the light scattering layer 20A, i.e., from the liquid crystal layer 13 side of the liquid crystal display device 100 shown in FIG. 1, is described with reference to FIG. 4. Also in this section, light 31 incident on the light scattering layer 20A is collimated light which propagates in the same direction.

Figure 4:
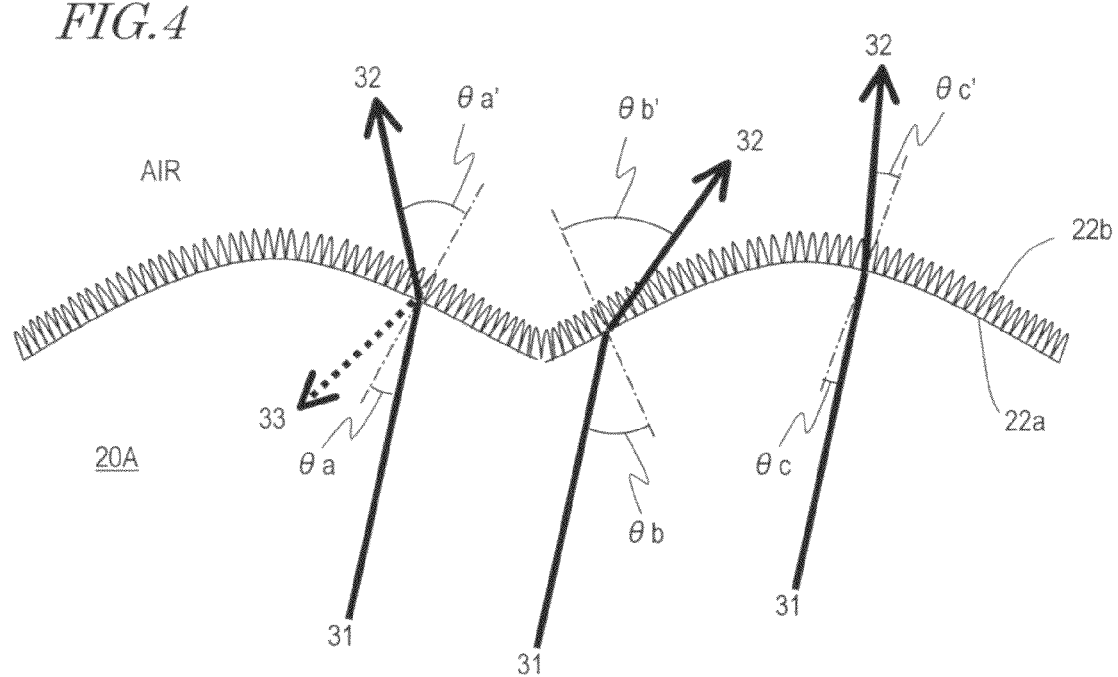
[FIG. 4] Schematic view for illustration of the function on display light incident on the light scattering layer 20A from the rear face side.
Figure 5:
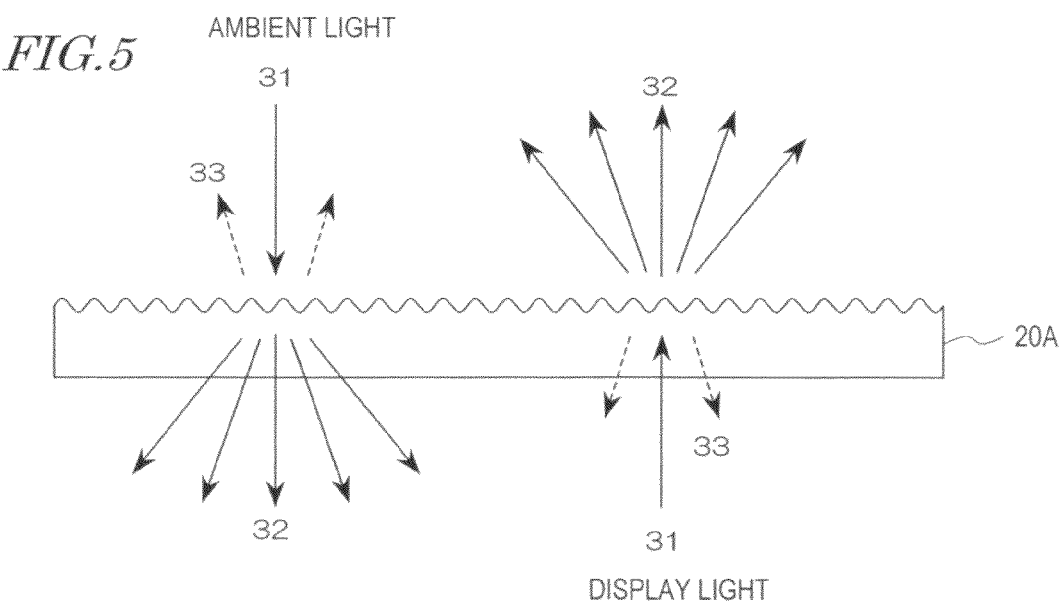
[FIG. 5] Schematic view for illustration of the function and effects of the light scattering layer 20A.

Since the surface of the light scattering layer 20A has the macro uneven structure 22a, the incident light is refracted in different directions according to the Snell's Law, depending on the position of incidence of light, as shown in FIG. 4. Thus, the following formulae (4) to (6) hold:

$$\sin \theta a = n \sin \theta a' \quad (4)$$

$$\sin \theta b = n \sin \theta b' \quad (5)$$

$$\sin \theta c = n \sin \theta c' \quad (6)$$

where n is the refractive index of the light scattering layer 20A, θa, θb, and θc are the angles of incidence, θa', θb', and θc' are the angles of emission.

Therefore, the light transmitted through the light scattering layer 20A is diffused in various directions in the same fashion as previously described with reference to FIG. 3.

Since the surface of the light scattering layer 20A includes the micro uneven structure 22b which is a motheye structure, the regular reflectance is 0.5% or lower. Therefore, the light quantity of reflected light (rearwardly-scattered light) 33 is very small, and 99.5% or more of the incident light 31 passes through the light scattering layer 20A to become scattered light 32. Thus, the light scattering layer 20A also functions as a substantially-ideal forward scattering layer for the light incident from the rear face side in the same fashion as previously described with reference to FIG. 3.

The light scattering layer 20A of the liquid crystal display device 100 functions as a substantially-ideal forward scattering layer as described above. Therefore, as schematically illustrated in the left part of FIG. 5, the ambient light scarcely undergoes specular reflection or rearward scattering. Thus, deterioration in display quality due to surface reflection, which would occur in the liquid crystal display device described in Patent Document 2, would not occur. Decrease in contrast ratio, which would occur in the liquid crystal display devices described in Patent Documents 3 and 4, would not occur. On the other hand, as schematically illustrated in the right part of FIG. 5, the display light (light reflected by the specular reflection layer 14r of FIG. 1) is scattered forward with scarce rearward scattering, so that excellent paper-white display is achieved. The degree of forward scattering (which means the same as the degree of diffuse reflection) is adjusted by controlling the size of the macro uneven structure 22a and is evaluated by the haze ratio. As described above, when the distance between the raised portions or recessed portions of the macro uneven structure 22a is from 5 µm to 50 µm, the haze ratio of 50% or higher, which is favorable for paper-white display, can be achieved. Note that, preferably, the light scattering layer of the present invention rather utilizes scattering by the scattering surface which has the above-described uneven structures and avoids utilizing internal scattering. This is because an internal scattering layer, which is typically formed of a resin matrix containing spherical particles dispersed therein, the spherical particles having a different refractive index from the resin matrix, causes rearward scattering as well as forward scattering, thereby decreasing the contrast ratio.

Note that, as the haze ratio increases, images disadvantageously become obscure. Now, causes of occurrence of obscure images are described with reference to FIG. 15.

FIG. 15 shows an example of a transmission-type liquid crystal display device which utilizes light emitted from a backlight 50 for display. The display device includes a first substrate 101 which has a driving circuit formed thereon, a second substrate 102 which has a color filter formed therein, and a liquid crystal layer interposed between the first substrate and the second substrate.

Provided on the surfaces of the respective substrates opposite to the liquid crystal layer are polarizing plates 106 and 107. Provided on the polarizing plate 107 on the viewer's side is a satin-finished surface (antiglare layer) 103, which is formed by a resin transfer method.

Light transmitted through a pixel 104a diffuses at a point 105 on the satin-finished surface 103. Light transmitted through a pixel 104b which is adjacent to the pixel 104a diffuses at the point 105. Therefore, a viewer sees an overlapping display of the pixel 104a and the pixel 104b at the point 105, which is perceived as obscuration of images.

To suppress and prevent the obscuration of images, the distance between the liquid crystal layer 13 and the scattering surface of the light scattering layer 20A is preferably as small as possible. Thus, the substrate 11, the polarization layer 17, and the retardation layer 18 are preferably as thin as possible. Preferably, the haze ratio is not excessively high. The upper limit of the haze ratio is preferably about 80%.

As a result of various researches, we found that the obscuration of images is acceptable so long as the distance between the liquid crystal layer 13 and the scattering surface of the light scattering layer 20A is substantially equal to or less than three times the pixel pitch of the liquid crystal display device. When the pixel pitch is 100 μm, for example, it is preferable that the thickness of the polarization layer 17 and the retardation layer 18 is 150 μm or smaller, and the thickness of the substrate 11 is 150 μm or smaller, so that the distance between the liquid crystal layer 13 and the scattering surface of the light scattering layer 20A is 300 μm or smaller.

Figure 6:
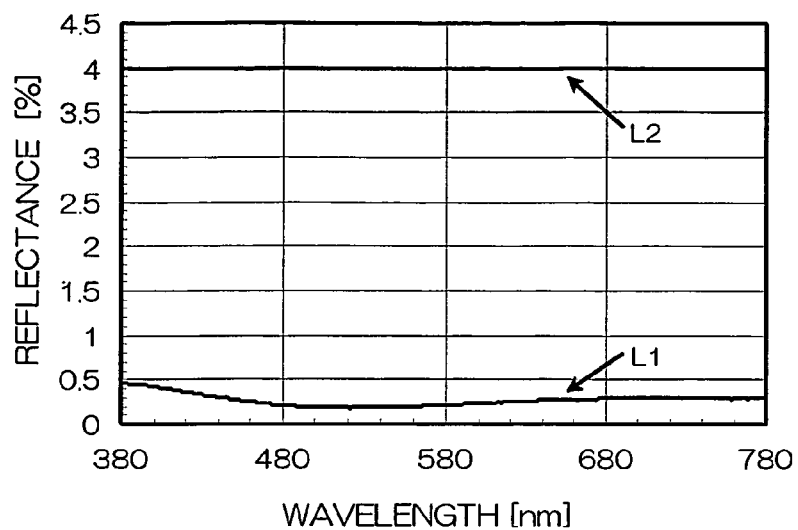
[FIG. 6] Graph of the spectral regular reflectance in a visible light wavelength range of the light scattering layer 20A.

An example of the measurement results of the spectral regular reflectance of the light scattering layer 20A which is preferably used in the liquid crystal display device 100 of the embodiment of the present invention is shown in FIG. 6. The vertical axis represents the regular reflectance, and the horizontal axis represents the incident light wavelength. L1 denotes the spectral regular reflectance of the light scattering layer 20A. L2 denotes the spectral regular reflectance of a reference sample which has a flat surface. As seen from FIG. 6, the reflectance of the reference sample which has a flat surface is 4% over a wide wavelength range of visible light, whereas the reflectance of the light scattering layer 20A which has the macro uneven structure and the micro uneven structure is a small value equal to or smaller than 0.5% over a full wavelength range of visible light. Simply estimating the front face contrast ratio from the regular reflectance, the contrast ratio increases by a factor of 8 or more by using the light scattering layer 20A.

Figure 7:
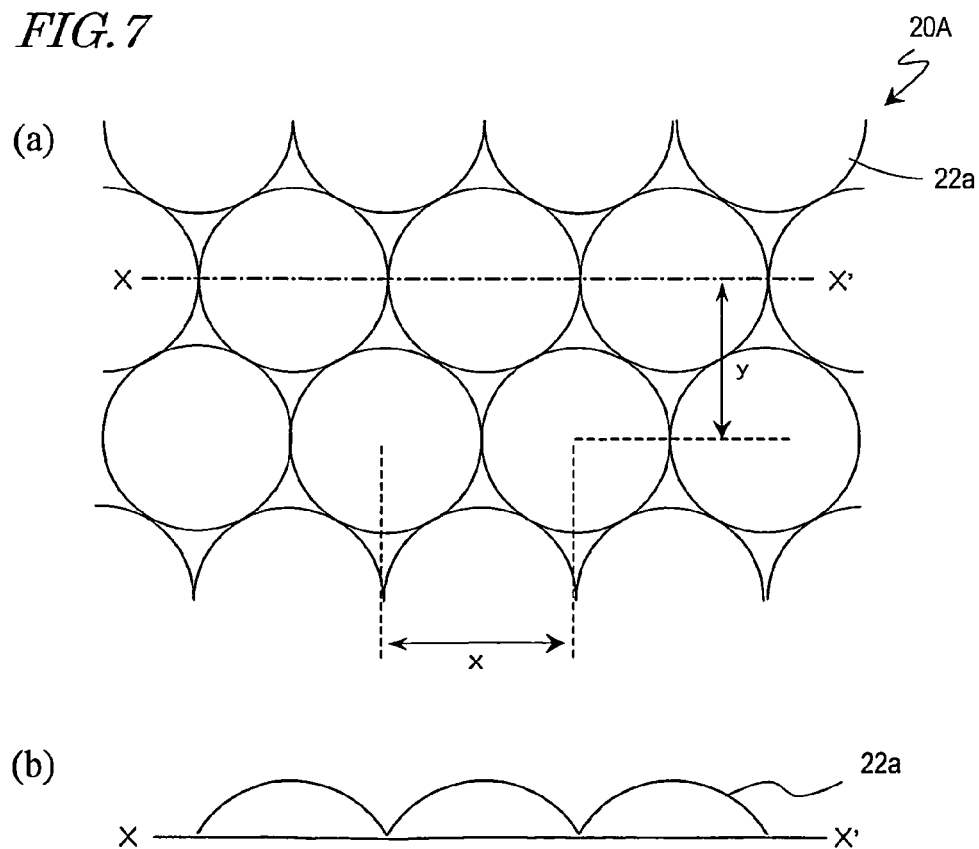
[FIG. 7] (a) is a schematic illustration of the outline of raised portions when the macro uneven structure 22a of the light scattering layer 20A is seen in a direction normal to the display surface. (b) is a cross-sectional view taken along line X-X' of (a).

Next, the relationship of the size of the macro uneven structure 22a of the light scattering layer 20A and the degree of scattering (degree of diffusion) is described with reference to FIG. 7 and FIG. 8. FIG. 7(a) schematically shows the outline of the raised portions of the macro uneven structure 22a of the light scattering layer 20A which is seen in a direction normal to the display surface. The horizontal pitch is x μm, and the vertical pitch is y μm. The outline of the raised portion is a circle. The diameter of the circle, R, is equal to the horizontal pitch x. FIG. 7(b) is a cross-sectional view taken along line X-X' of FIG. 7(a). The cross-sectional shape of each raised portion of the macro uneven structure 22a is part of a circle (for example, part of a circle which includes a circular arc with the interior angle of about 60°).

Figure 8:
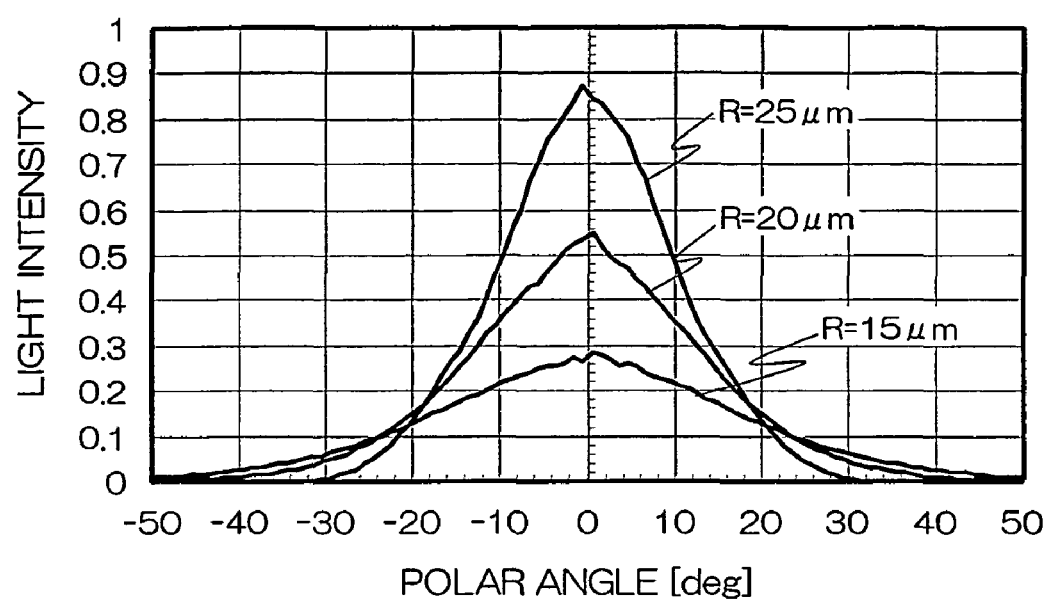
[FIG. 8] Graph which illustrates the polar angle dependence of the reflected light intensity of the light scattering layer.

FIG. 8 is a graph which illustrates the polar angle dependence of the reflected light intensity of the light scattering layer, showing the measurement result for a case where the diameter R of the circle of the macro uneven structure 22a is 20 μm, together with the measurement results for diameter R of 15 μm and 25 μm. In the examples described herein, the ratio of the depth (D) of the macro uneven structure 22a to the distance (S) between the raised portions, RA=D/S, is 0.16 in the case of R=15 μm, 0.21 in the case of R=20 μm, and 0.31 in the case of R=25 μm. Note that the measurement of the reflected light intensity was carried out using an LCD evaluation system (LCD-5200) manufactured by Otsuka Electronics Co., Ltd. Specifically, the intensity of reflected light from the respective light scattering layers placed on a specular surface formed by a thin aluminum film was measured with a photodetector moving over the spherical surface (i.e., with varying polar angles).

As clearly seen from FIG. 8, the peak value of the reflected light intensity significantly decreases as the diameter R of the circle of the raised portion of the macro uneven structure 22a decreases from 25 μm, 20 μm, and to 15 μm, and the reflected light is distributed over a wide polar angle range. Thus, the angular range of the distribution of the scattered light expands (the scattering angle increases) as the size of the raised portions decreases. Therefore, the forward scattering power (diffuse reflection power) of the light scattering layer 20A can be adjusted by appropriately adjusting the size of the raised portions of the macro uneven structure 22a.

Next, an example of the fabrication method of the light scattering layer 20A of the liquid crystal display device of this embodiment is described below.

The light scattering layer 20A can be formed using a transfer technique. Specifically, a stamper which has an uneven structure for the formation of a surface with uneven structures (including a macro uneven structure and a micro uneven structure) of the light scattering layer 20A is fabricated, and this stamper is used to transfer the uneven structure to a resin layer.

The process of fabricating the stamper includes the step of forming an unevenness for the formation of the macro uneven structure of the light scattering layer 20A and the step of forming an uneven structure for the formation of the micro uneven structure of the light scattering layer 20A.

Examples of the step of forming a macro unevenness in the stamper include directly forming an unevenness using a cutting method, and transferring an uneven surface made of a resin or the like to a metal surface of nickel or the like using an electrotyping method.

For example, an acrylic base member having a thickness of 3 mm is processed by a cutting method to form spherical dimples with the horizontal pitch of 20 μm, the vertical pitch of 18 μm, the depth of 4.3 μm, and the radius of 20 μm, whereby an unevenness for the formation of the macro uneven structure 22a of the light scattering layer 20A can be formed.

As a method of forming a micro unevenness in the stamper which has the macro unevenness previously formed, the method described in Patent Document 6 by the applicant of the present application can preferably be used. The entirety of the disclosure of Patent Document 6 is incorporated herein by reference. Hereinafter, this method is described with reference to FIG. 9(a) to FIG. 9(g).

Figure 9:
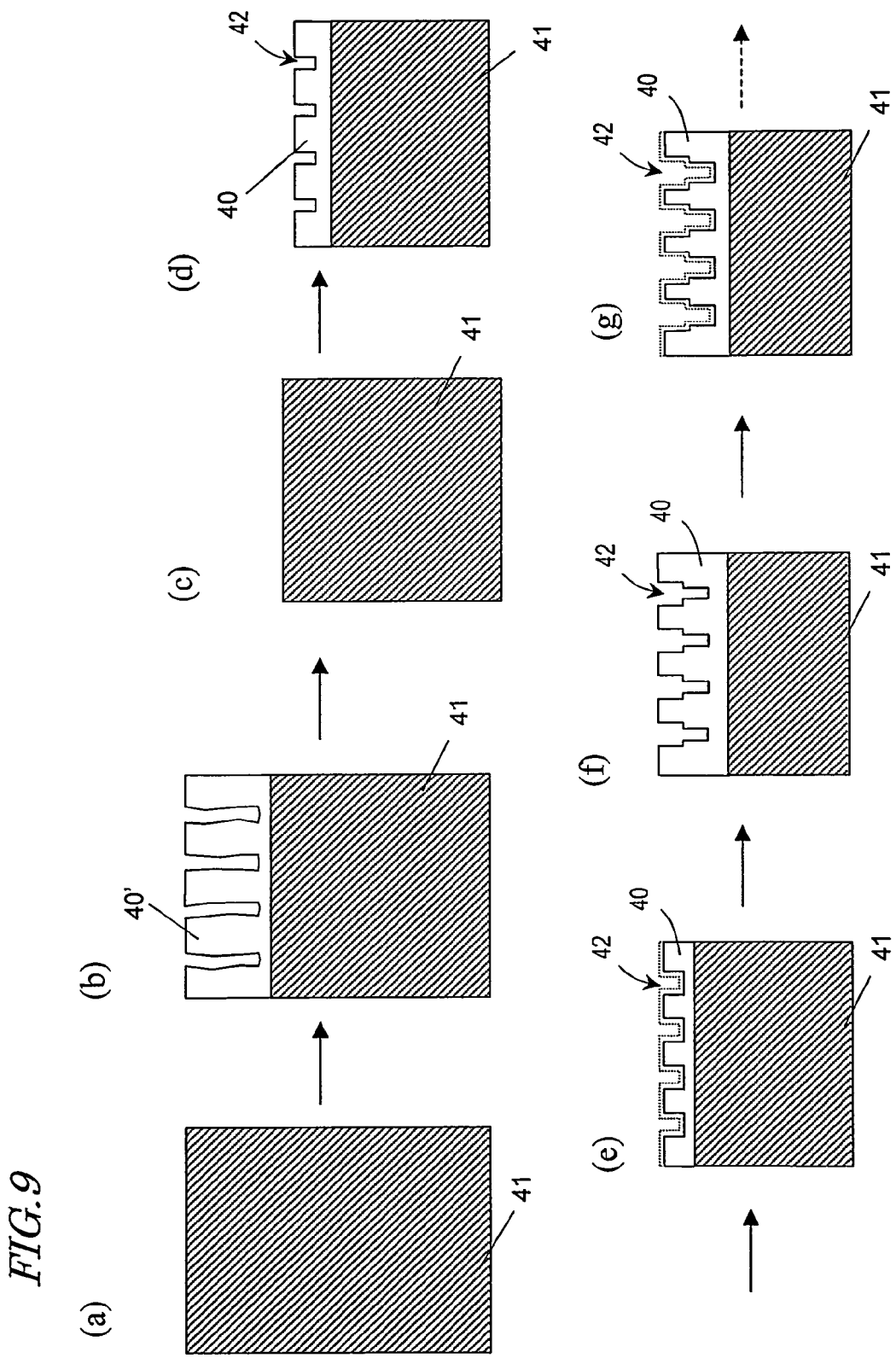
[FIG. 9] (a) to (g) are schematic views for illustration of a method for forming a micro unevenness in a stamper.

First, an aluminum layer (hereinafter, Al layer) is formed by a vacuum deposition method over the uneven surface of the stamper in which the macro unevenness have been formed. FIG. 9(a) shows the Al layer 41 formed over the stamper surface.

Then, part of (surface part of) the Al layer 41 is subjected to anodic oxidation under predetermined conditions to form a porous alumina layer 40' as shown in FIG. 9(b). The size of pores, the pore formation density, the depth of pores, etc., can be controlled by changing the conditions of the anodic oxidation (for example, the forming voltage, the type and concentration of the electrolytic solution, as well as the duration of anodic oxidation). Also, the regularity of arrangement of the pores can be controlled by controlling the level of the forming voltage. For example, the conditions for obtaining an arrangement with high regularity are: (1) using an appropriate constant voltage inherent to the electrolytic solution to perform the anodic oxidation; and (2) conducting the anodic oxidation for a long time period. Known combinations of the electrolytic solution and the forming voltage which meet the above conditions are 28 V for sulfuric acid, 40 V for oxalic acid, and 195 V for phosphoric acid.

The porous alumina layer 40' which is formed in the initial steps has a tendency to have an irregular pore arrangement. Thus, in consideration of reproducibility, the initially-formed porous alumina layer 40' is preferably removed as shown in FIG. 9(c). The thickness of the porous alumina layer 40' is preferably 200 nm or more in view of reproducibility and is preferably 2000 nm or less in view of productivity.

As a matter of course, when necessary, the steps (e) to (g) described below may be carried out without removing the porous alumina layer 40'. The porous alumina layer 40' may be removed partially (e.g., from the surface to a certain depth), although in the example illustrated in FIG. 9(c) the porous alumina layer 40' is totally removed. The removal of the porous alumina layer 40' may be carried out using a known method. For example, the structure is immersed in a phosphoric acid aqueous solution or chromium-phosphoric acid mixture solution for a predetermined time period such that the layer 40' is removed.

Thereafter, the anodic oxidation is carried out again to form a porous alumina layer 40 which have pores 42 as shown in FIG. 9(d). The size of pores, the pore formation density, the depth of pores, the regularity of arrangement, etc., are controlled by controlling the conditions and duration of the anodic oxidation.

Then, the porous alumina layer 40 which have the pores 42 is brought into contact with an alumina etchant to etch away a predetermined amount, such that the pore diameter of the pores 42 is increased as shown in FIG. 9(e). Employing wet etching in this step enables substantially isotropic expansion of the pore wall and the barrier layer. The etching amount (i.e., the size and depth of the pores 42) can be controlled by adjusting the type and concentration of the etching solution and the etching duration. For example, the structure is immersed in a phosphoric acid aqueous solution or chromium-phosphoric acid mixture solution for a predetermined time period such that the predetermined part is removed.

Thereafter, part of the Al layer 41 undergoes the anodic oxidation again such that the pores 42 are grown in the depth direction and the thickness of the porous alumina layer 40 is increased as shown in FIG. 9(f). Here, the growth of the pores 42 starts at the bottom of the previously-formed pores 42, so that the lateral surface of the pores 42 has a stepped shape.

Thereafter, the porous alumina layer 40 is brought into contact with an alumina etchant for additional etching such that the diameter of the pores 42 is further increased as shown in FIG. 9(g).

By repeating the above-described anodic oxidation step (FIG. 9(d)) and the above-described etching step (FIG. 9(e)), the porous alumina layer 40 provided with the pores (minute recessed portions) 42 which has a desired uneven shape is obtained. By appropriately determining the conditions of the respective one of the anodic oxidation step and the etching step, the size of the pores 42, the pore generation density, and the pore depth, as well as the stepped shape of the lateral surface of the pores 42, can be controlled. To decrease the area of the bottom of the pores 42, the process is preferably finished with the anodic oxidation step (with no etching step performed thereafter).

In the process described herein where the anodic oxidation step and the etching step are alternately performed, a washing step and a drying step subsequent thereto may be carried out between the anodic oxidation step and the etching step or between the etching step and the anodic oxidation step.

With the above-described method, a micro unevenness are randomly formed and have varying shapes. When forming the micro uneven structure 22b such that, for example, the average distance between adjacent raised portions or recessed portions is about 150 nm and the average depth of the uneven structure is more than about 100 nm, the regular reflectance can be 0.5% or less.

In this way, the stamper having an uneven surface for the formation of a surface of the light scattering layer 20A which has the uneven structure (including the macro uneven structure 22a and the micro uneven structure 22b) is fabricated.

The process of transferring an uneven structure to a resin layer using the fabricated stamper is, for example, carried out as described below.

First, a film (e.g., 4 μm thick) of a photocurable resin (e.g., a urethane acrylate resin) is formed over a substrate (e.g., a PET film of 50 μm thick). This step can be carried out using a known film formation method with a spin coater (e.g., 1000 rpm), a slit coater, or the like.

The uneven surface of the stamper is pressed against the photocurable resin film formed over the substrate. The uneven surface of the stamper is preferably subjected to a mold release treatment in advance. The pressing step is preferably carried out in a reduced-pressure atmosphere. When exposed to the ambient air, the recessed portions of the uneven surface of the stamper are surely filled with the photocurable resin.

Then, the photocurable resin is irradiated with UV (e.g., irradiated with UV at 365 nm with 10 mW for 360seconds) from the substrate side to be cured. When necessary, thermosetting (postbaking) may be carried out.

Thereafter, the stamper is separated from the substrate, so that a cured material layer of the photocurable resin to which the uneven structure of the stamper has been transferred is formed on the surface of the substrate.

In this way, the light scattering layer 20A is obtained which has a surface including a macro uneven structure and a micro uneven structure superimposedly formed thereover. The haze ratio of this light scattering layer 20A is about 50%. The haze ratio was measured using a haze meter (NDH2000) manufactured by NIPPON DENSHOKU INDUSTRIES CO., LTD.

OTHER EXAMPLES OF LIGHT SCATTERING LAYER

In the above-described macro uneven structure 22a of the light scattering layer 20A, the outline of the raised portions when seen in a direction normal to the display surface is a circle with the diameter of 20 μm. The raised portions are in a regular arrangement with the horizontal pitch of 20 μm and the vertical pitch of 18 μm.

The macro uneven structure of the light scattering layer used in the liquid crystal display device 100 of the embodiment of the present invention is not limited to the above example. A macro uneven structure 24a of a light scattering layer 20B shown in FIG. 10 may be used in which, when seen in a direction normal to the display surface, the outlines of the raised portions are circles of different diameters, and the raised portions are in a random arrangement in a plane. Using the raised portions of different diameters together can decrease the occurrence of interference of scattered light. With smaller interference of scattered light, occurrence of moiré fringes due to the two periodic structures (in this example, the pixel pitch and the macro uneven structure) can be decreased.

Figure 11:
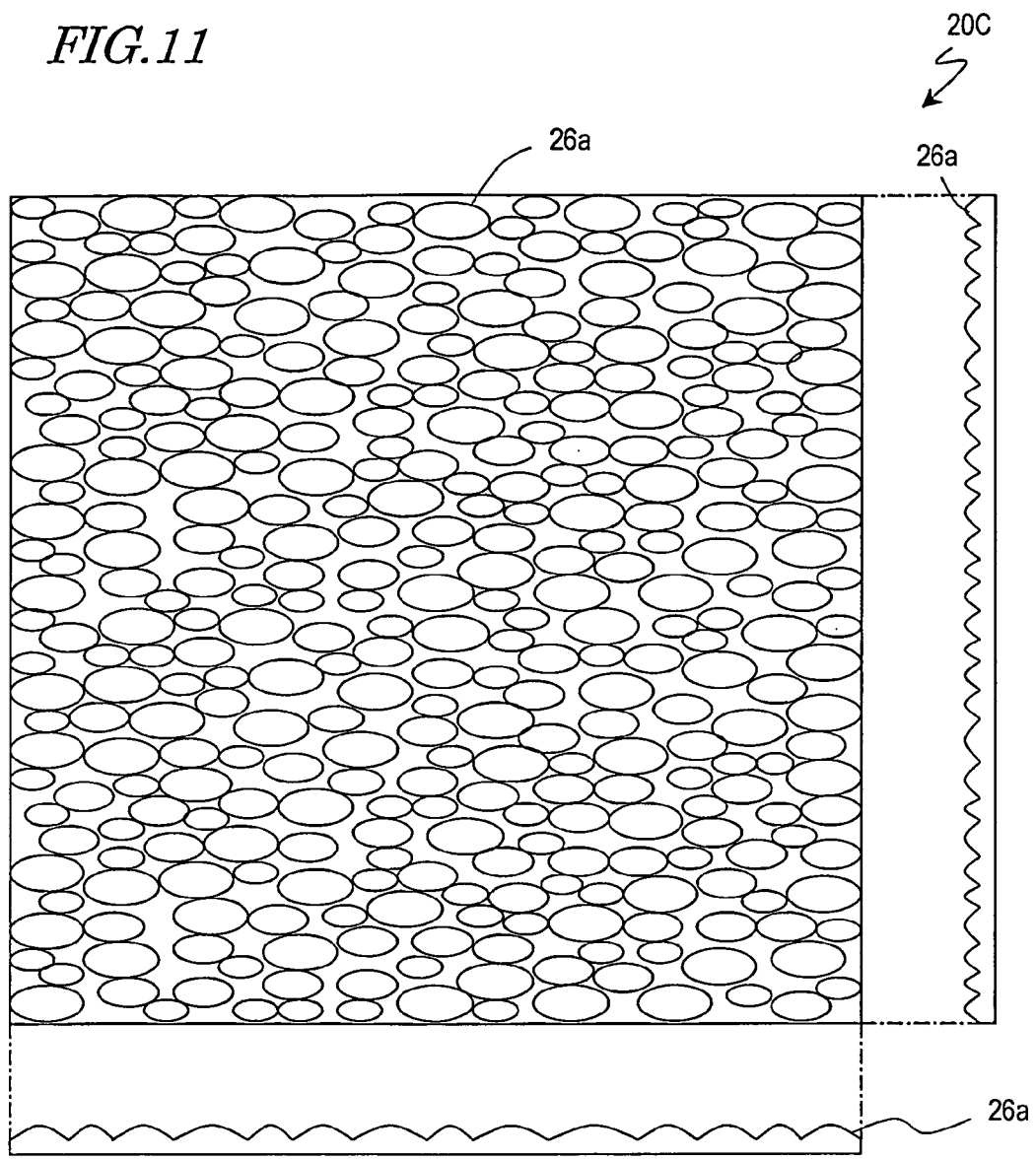
[FIG. 11] Schematic plan view and cross-sectional views for illustration of a macro uneven structure 26a of a light scattering layer 20C.

Alternatively, a macro uneven structure 26a of a light scattering layer 20C shown in FIG. 11 may be used in which, when seen in a direction normal to the display surface, the outlines of the raised portions are ovals of different sizes, and the raised portions are in a random arrangement. Herein, the raised portions are arranged such that the long axes of the ovals are parallel with respect to the horizontal direction and that the long axes of the ovals are parallel with respect to the vertical direction.

Figure 10:
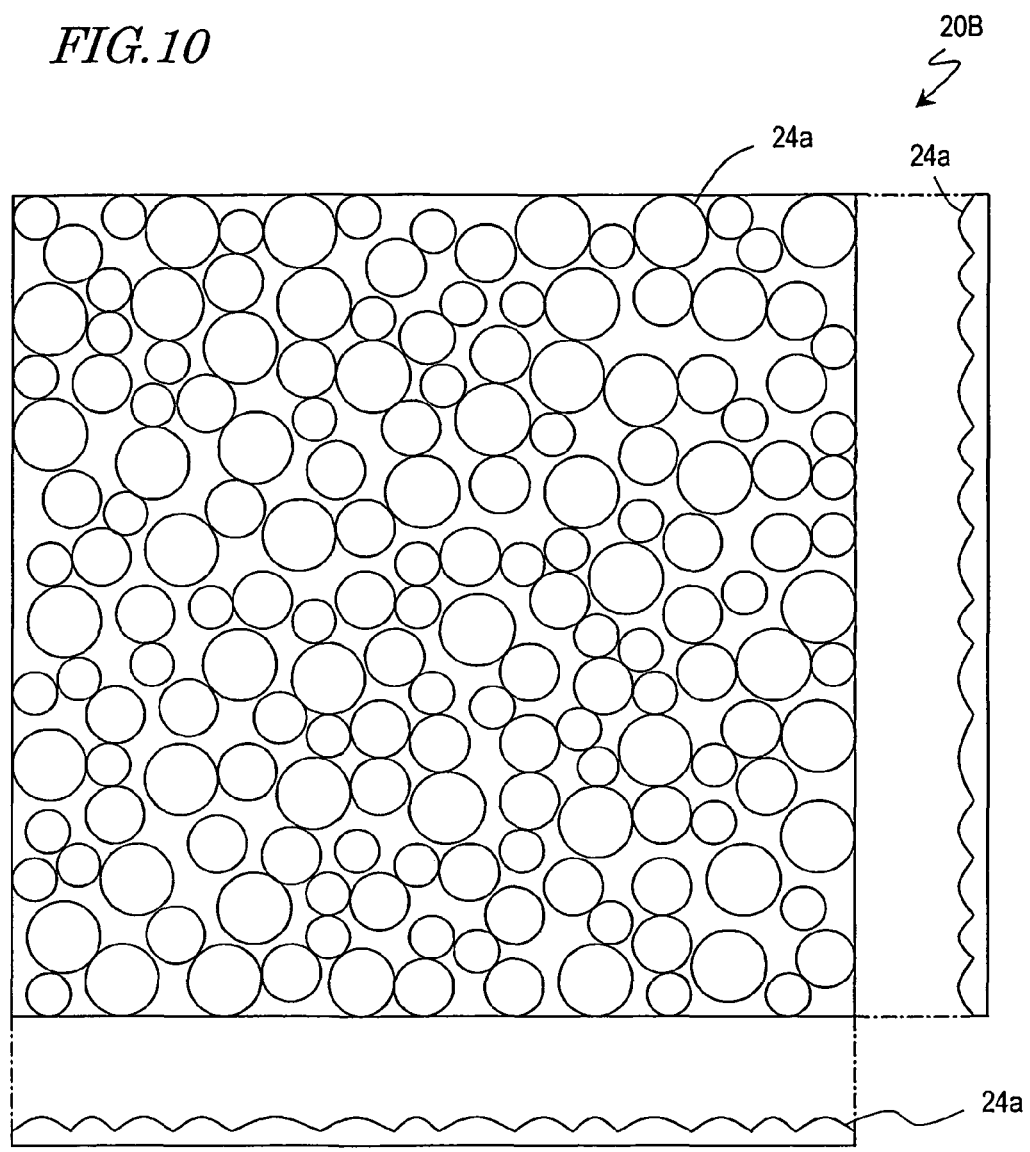
[FIG. 10] Schematic plan view and cross-sectional views for illustration of a macro uneven structure 24a of a light scattering layer 20B.

When one raised portion has an isotropic shape as shown in FIG. 2 or FIG. 10, the viewing angle characteristics achieved are uniform both vertically and horizontally. When one raised portion has an anisotropic shape as shown in FIG. 11, the vertical viewing angle characteristics and the horizontal viewing angle characteristics can be different.

When the long axes of the ovals are parallel with respect to the horizontal direction as in the macro uneven structure 26a shown in FIG. 11, the horizontal viewing angle is narrower than the vertical viewing angle.

In the reflection-type liquid crystal display devices, ambient light comes from the above in many cases, e.g., sunlight, fluorescent lamps, etc. Therefore, decreasing the vertical diameter to increase the vertical scattering angle is rather advantageous because light can be introduced from a wider angle range. As for the horizontal direction, increasing the diameter to narrow the viewing angle is advantageous especially for personal-use devices, such as mobile phones, because peeking can be prevented. Thus, the viewing angle for display in the reflection mode can be adjusted by using such raised portions (or recessed portions) which has an asymmetric shape defined by long and short axes when the light scattering layer is seen in the normal direction and in which the long axis is oriented in a predetermined direction relative to the transmission axis of the polarization layer.

Figure 12:
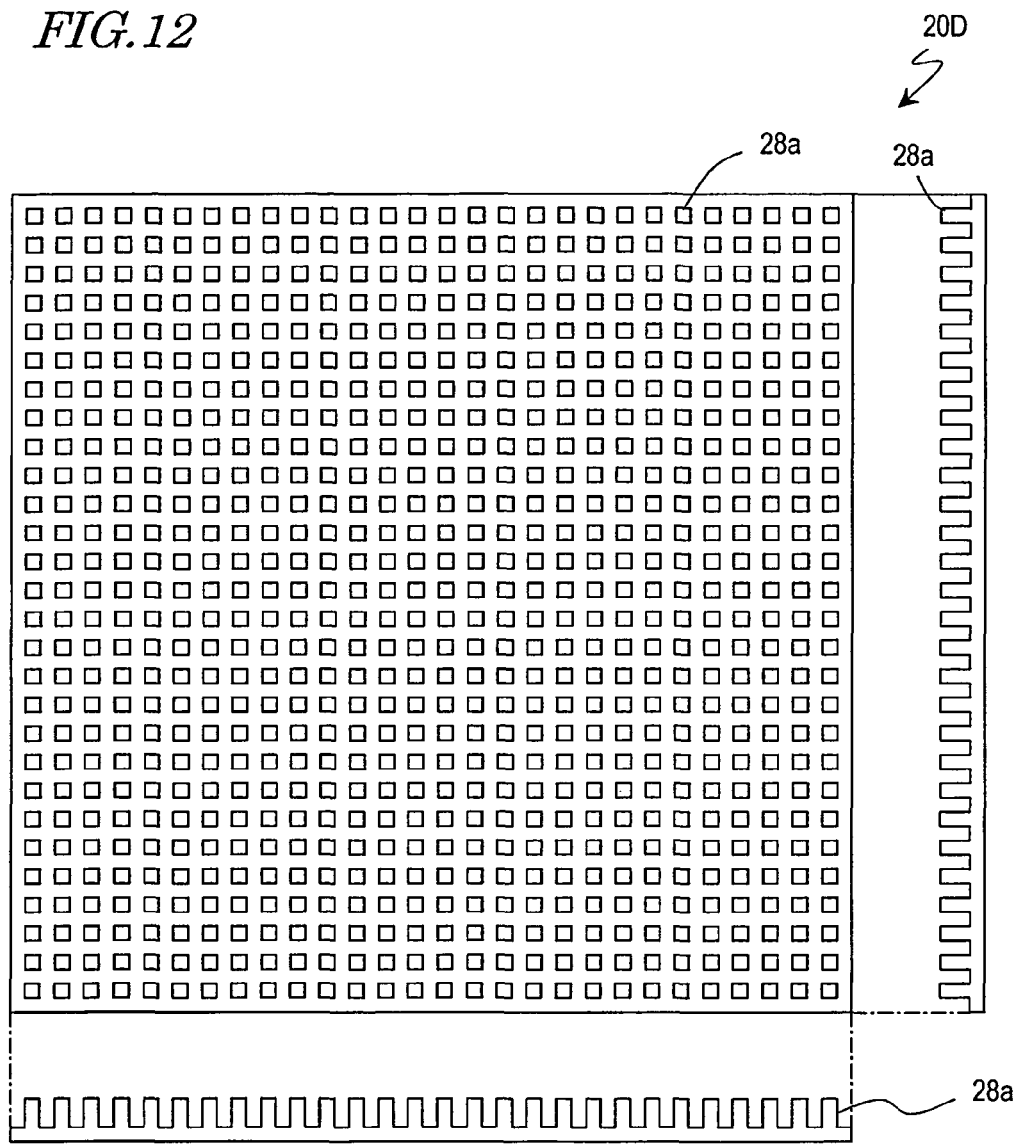
[FIG. 12] Schematic plan view and cross-sectional views for illustration of a macro uneven structure 28a of a light scattering layer 20D.

Alternatively, the light scattering layer 20D shown in FIG. 12 may be used in which a macro uneven structure 28a is a diffraction grating. To sufficiently increase the diffraction angle, the period of the diffraction grating is preferably 10 μm or less.

Figure 13:
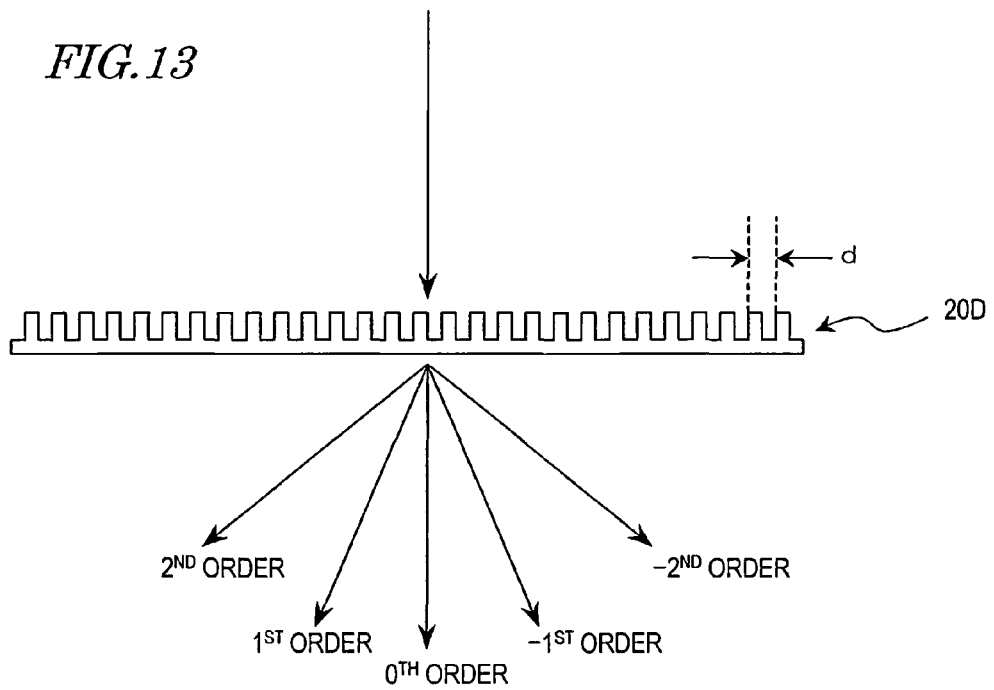
[FIG. 13] Schematic view for illustration of the function of the light scattering layer 20D.

The diffraction angle of light vertically incident on the diffraction grating is described with reference to FIG. 13. The diffraction angle of the $n^{th}$-order diffracted light, $\theta n$, can be represented by the following formula:

$$\theta n = \sin^{-1}(n\lambda/d)$$

where d is the period of the diffraction grating (the period of the unevenness), and λ is the wavelength of light.

Thus, the diffraction angle of light can be controlled by changing the period of the unevenness. Such a periodic structure can be formed by, for example, interference exposure (holography) with laser light.

Note that the viewer-side surface of the light scattering layer 20A of the liquid crystal display device 100 (scattering surface) is in contact with air, to which the present invention is not limited. Specifically, the viewer's side of the scattering surface of the light scattering layer 20A may be provided with a protection layer. By providing the protection layer, the scattering surface of the light scattering layer can be prevented from becoming dirty, or dirt can readily be removed.

Note that the refractive index of the protection layer need to be smaller than the refractive index of the light scattering layer. This is because the scattering power of the light scattering layer deteriorates as the difference in refractive index between the protection layer and the light scattering layer decreases. Preferably, the protection layer is sufficiently thin such that the macro uneven structure of the light-scattering surface is not buried. A preferable material of the protection layer is fluoric resins and silicone resins.

[Transflective Type (Reflection-Transmission Combination Type) Liquid Crystal Display Device]

Figure 14:
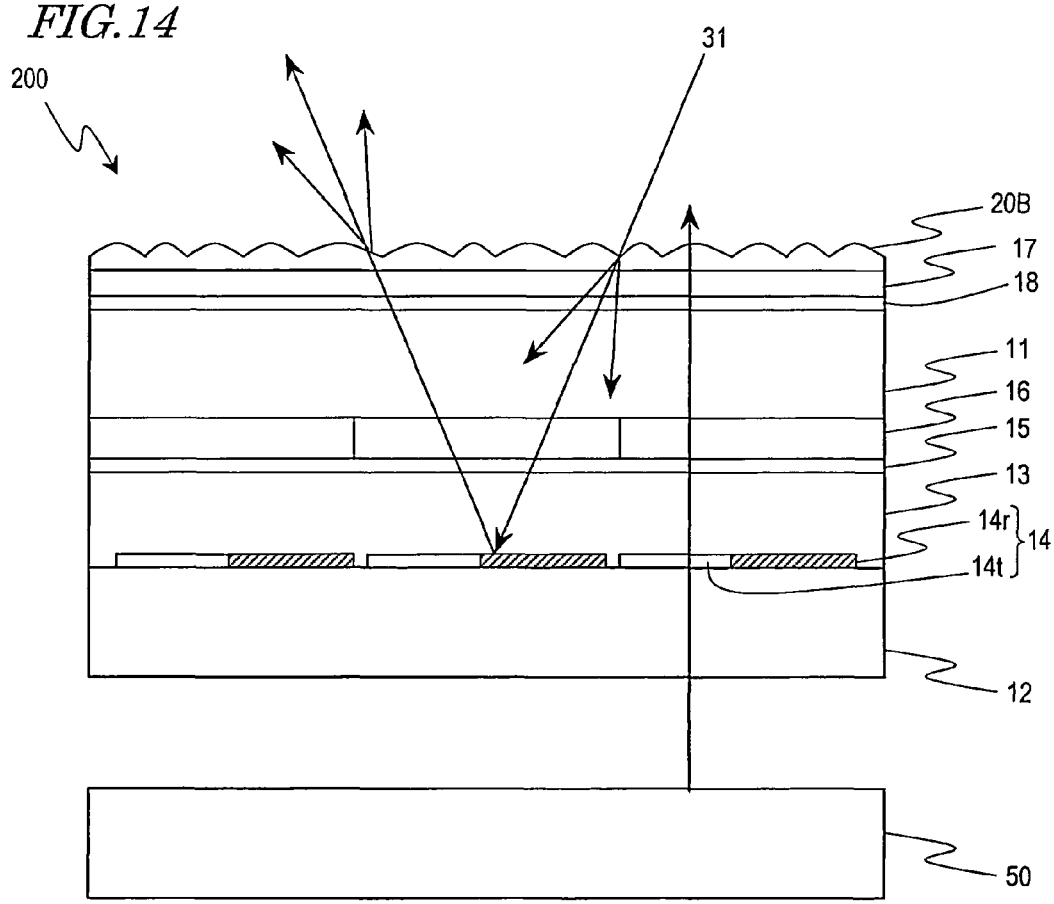
[FIG. 14] Schematic cross-sectional view of a transflective-type liquid crystal display device 200 of an embodiment of the present invention.

The present invention is also applicable to a transflective-type liquid crystal display device 200 as shown in FIG. 14, although the reflection-type liquid crystal display device has been described in the above embodiment.

In the transflective-type liquid crystal display device 200 shown in FIG. 14, each pixel includes a reflection region and a transmission region. The reflection region is defined by a reflective electrode 14r. The transmission region is defined by a transparent pixel electrode 14t. The device 200 further includes a backlight 50 for display in the transmission mode. The other elements are substantially the same as those of the liquid crystal display device 100 and are therefore denoted by the common reference numerals, and the description thereof is herein omitted.

Since the transflective-type liquid crystal display device 200 has the light scattering layer 20B which serves as a substantially-ideal forward scattering layer, ambient light scarcely undergoes specular reflection and rearward scattering during display in the reflection mode as in the liquid crystal display device 100. Therefore, deterioration in display quality due to surface reflection, which would occur in the liquid crystal display device described in Patent Document 2, would not occur. Also, deterioration in contrast ratio, which would occur in the liquid crystal display devices described in Patent Documents 3 and 4, would not occur. As a matter of course, the light scattering layer 20B may be replaced by any of the above-described light scattering layers 20A and 20C to 20D and variations thereof. The thickness of the liquid crystal layer 13 may be optimized separately in the reflection region and the transmission region. In brief, the present invention is applicable to a wide range of known transflective-type liquid crystal display devices.

Patent Document 5 describes an antireflection film which utilizes a motheye structure. The antireflection film described in Patent Document 5 is to prevent glare which would occur due to reflection at the outermost surface of the display device or the like. Patent Document 5 fails to disclose or suggest a light scattering layer which is to diffuse the display light of a reflection-type liquid crystal display device using a specular reflection layer. Specifically, the uneven surface described in Patent Document 5 only need to scatter regular reflection and, therefore, the haze ratio thereof only need to be about 10% and does not exceed 30%.

It is clear that the effects resulting from the provision of the above-described light scattering layer do not depend on the display mode of the liquid crystal display device (e.g., TN mode, VA mode, IPS mode). Therefore, the present invention is applicable to a wide range of known reflection-type and transflective-type liquid crystal display devices. For example, the present invention is applicable to IPS-mode transflective-type liquid crystal display devices described in Japanese Laid-Open Patent Publications Nos. 2005-338256 and 2006-98623. The entirety of the disclosures of Japanese Laid-Open Patent Publications Nos. 2005-338256 and 2006-98623 is incorporated herein by reference. As described in these publications, it is only required that a retardation layer interposed between the viewer-side polarization layer and the liquid crystal layer should be selectively provided only in a region where display is carried out in the reflection mode. When the retardation of the liquid crystal layer in the reflection region is a quarter wavelength, the retardation of the retardation layer is preferably a half wavelength. Thus, the retardation of the retardation layer interposed between the viewer-side polarization layer and the liquid crystal layer is appropriately set according to the retardation of the liquid crystal layer in the reflection region.

Industrial Applicability

A reflection-type or transflective-type liquid crystal display device of the present invention is suitable for use in display devices of mobile applications, such as display devices of mobile phones, etc.

The invention claimed is:

1. A liquid crystal display device, comprising:
   a liquid crystal layer;
   a first substrate disposed on a viewer's side of the liquid crystal layer;
   a second substrate disposed so as to oppose the first substrate via the liquid crystal layer;
   a specular reflection layer, comprising a pixel electrode, interposed between the liquid crystal layer and the second substrate;
   a pair of electrodes for applying a voltage to the liquid crystal layer;
   a polarization layer disposed on a viewer's side of the first substrate;
   a retardation layer interposed between the liquid crystal layer and the polarization layer; and
   a light scattering layer disposed on a viewer's side of the polarization layer, the light scattering layer having a scattering surface, the scattering surface including a macro uneven structure which has a light scatterability and a micro uneven structure which is superimposedly formed over the macro uneven structure and which is smaller than visible light wavelengths, wherein
   a distance between the liquid crystal layer and the scattering surface of the light scattering layer is substantially equal to or less than three times the pixel pitch of the liquid crystal display device.

2. The liquid crystal display device of claim 1, wherein a distance between adjacent raised portions or recessed portions of the micro uneven structure is in a range equal to or greater than 100 nm and smaller than 200 nm.

3. The liquid crystal display device of claim 1, wherein a distance between raised portions or recessed portions of the macro uneven structure is from 5 μm to 50 μm.

4. The liquid crystal display device of claim 3, wherein the macro uneven structure has a periodic structure which has a pitch of 20 μm or less.

5. The liquid crystal display device of claim 1, wherein a haze ratio of the light scattering layer is 50% or higher.

6. The liquid crystal display device of claim 1, wherein a distance between the light scattering layer and the liquid crystal layer is equal to or less than three times a pixel pitch.

7. The liquid crystal display device of claim 1, wherein the raised portions or recessed portions of the macro uneven structure have an asymmetric shape which has a long axis and a short axis, and the long axis being oriented in a predetermined direction relative to a transmission axis of the polarization layer when the light scattering layer is seen in a direction normal to the first substrate.

8. The liquid crystal display device of claim 1, wherein the scattering surface of the light scattering layer is in contact with air.

9. The liquid crystal display device of claim 1, further comprising a protection layer disposed on a viewer's side of the scattering surface of the light scattering layer, wherein a refractive index of the protection layer is smaller than a refractive index of the light scattering layer.

10. The liquid crystal display device of claim 1, wherein reflectance of the light scattering layer has a value equal to or smaller than 0.5% over a full wavelength range of visible light.

11. The liquid crystal display device of claim 1, wherein a ratio of a depth of the macro uneven structure to a distance between raised portions of macro uneven structures is 0.1 to 0.4, wherein the depth is a distance from the apex of a raised portion to a bottom of a raised portion of the macro uneven structure.

* * * * *